(12) United States Patent
Turner

(10) Patent No.: US 7,878,277 B2
(45) Date of Patent: Feb. 1, 2011

(54) MOTORIZED WHEELED VEHICLE CADDY

(75) Inventor: Patrick E. Turner, Rogers, AR (US)

(73) Assignee: Assembled Products Corporation, Rogers, AR (US)

( * ) Notice: Subject to any disclaimer, the term of this patent is extended or adjusted under 35 U.S.C. 154(b) by 237 days.

(21) Appl. No.: 12/077,790

(22) Filed: Mar. 21, 2008

(65) Prior Publication Data

US 2008/0230286 A1    Sep. 25, 2008

Related U.S. Application Data

(60) Provisional application No. 60/919,552, filed on Mar. 23, 2007.

(51) Int. Cl.
*B62D 51/04* (2006.01)
(52) U.S. Cl. ..................... 180/19.3; 180/19.2
(58) Field of Classification Search .............. 180/19.1, 180/19.2, 19.3, 11, 12, 13
See application file for complete search history.

(56) References Cited

U.S. PATENT DOCUMENTS

| | | | | |
|---|---|---|---|---|
| 3,166,141 A | * | 1/1965 | Shields et al. | 180/21 |
| 3,179,196 A | * | 4/1965 | Richardson | 180/14.1 |
| 3,387,681 A | * | 6/1968 | Rabjohn | 180/13 |
| 3,417,833 A | * | 12/1968 | McRae | 180/19.1 |
| 3,861,482 A | * | 1/1975 | Stephens et al. | 180/13 |
| 4,629,391 A | | 12/1986 | Soyk et al. | |
| 5,139,102 A | | 8/1992 | Pocapalia | |
| 5,343,678 A | * | 9/1994 | Stuart | 56/11.3 |
| 5,439,069 A | * | 8/1995 | Beeler | 180/11 |
| 5,573,078 A | * | 11/1996 | Stringer et al. | 180/19.2 |
| 5,860,485 A | | 1/1999 | Ebbenga | |
| 6,481,518 B1 | | 11/2002 | Wu | |
| 7,159,677 B1 | * | 1/2007 | Lam et al. | 180/65.51 |

* cited by examiner

*Primary Examiner*—Tony H. Winner
(74) *Attorney, Agent, or Firm*—Boyd D. Cox

(57) ABSTRACT

A motorized wheeled vehicle caddy for pushing or pulling one or more wheeled vehicles can be used to move and/or maneuver the vehicle(s) to different locations and positions. The vehicle caddy includes a hitch mechanism to attach the vehicle to the caddy, a suspension mechanism to align the caddy and vehicle when connecting the two, a steering mechanism to guide the movement of the caddy and attached vehicle, and a power drive mechanism to move the caddy and attached vehicle. Being compact in size and lightweight, the motorized wheeled vehicle caddy is also convenient for use in areas with limited space.

20 Claims, 5 Drawing Sheets

MOTORIZED WHEELED VEHICLE CADDY

Priority for this application is claimed from U.S. Provisional Application No. 60/919,552 entitled "Motorized Wheeled Vehicle Caddy" filed on Mar. 23, 2007

I. BACKGROUND

The present invention is directed to a motorized wheeled vehicle caddy for pushing or pulling wheeled vehicles in order to move them from one place to another. The motorized wheeled vehicle caddy can be used for moving a variety of wheeled vehicles, including shopping carts, dollies, hand trucks, hospital carts, linen carts, maintenance carts, hospital beds and the like.

Many carts or other wheeled vehicles are non-motorized and must be manually pushed or pulled to maneuver or move. Often, due to their size and weight, these vehicles are difficult to move by pushing or pulling. There is a need for a device to facilitate moving these heavy loads in order to reduce fatigue and avoid injuries for those moving the loads.

Moving a bulky and/or heavy wheeled vehicle manually can be physically challenging and time consuming. With a motorized wheeled vehicle caddy to assist, an operator can decrease the amount of time required to move a heavy wheeled vehicle from one location to another.

When moving such wheeled vehicles in buildings such as, a hospital, it is often necessary to go from one floor to the next. Such movement requires the use of an elevator. Space on an elevator is generally at a premium, so there is a need for a motorized wheeled vehicle caddy that is small enough to fit on an elevator with an attached hospital cart, for example. Maneuvering into and out of small areas, like an elevator, requires that the caddy be able to readily both push and pull the attached vehicle.

The wheeled vehicle caddies of the prior art are generally larger in size and, therefore, can be more cumbersome to use. This renders it difficult for an operator to easily maneuver an attached vehicle within an area with limited space.

Also, in the prior art, wheeled vehicle caddies typically require the operator to move from the operating position when connecting and disconnecting a wheeled vehicle to the wheeled vehicle caddy. Having to move from the operating position to connect or disconnect a vehicle to the wheeled vehicle caddy and then moving back to the operator's position to drive the wheeled vehicle caddy is inefficient and time-consuming for the caddy operator. Furthermore, such inefficiency can be frustrating for one using the wheeled vehicle caddy.

It is generally recognized in the prior art that a portion of the wheeled vehicle is lifted off the floor when connecting the vehicle to the wheeled vehicle caddy, thereby requiring the wheeled vehicle caddy to support the weight of the wheeled vehicle during use. This increases the instability of the combined device comprised by the wheeled vehicle caddy and attached vehicle. Furthermore, to lift the wheeled vehicle off the ground during attachment and use requires that the wheeled vehicle caddy be strong and durable enough to support the additional weight of the attached vehicle. Such requirements can increase the manufacturing cost of the wheeled vehicle caddy.

With prior art wheeled vehicle caddies, making the connection between the wheeled vehicle caddy and the wheeled vehicle on uneven terrain is difficult, if not impossible. In the present invention, a hitching assembly allows the motorized wheeled vehicle caddy and the wheeled vehicle to be readily aligned for attachment, even on uneven terrain.

With the present invention, the operator can engage or disengage the hitch to respectively attach or detach the wheeled vehicle from the motorized wheeled vehicle caddy while standing in the operating position behind the motorized wheeled vehicle caddy. Consequently, the operator does not have to move away from the user position to attach or detach the wheeled vehicle.

Carts or other wheeled vehicles are not lifted off the ground by the motorized wheeled vehicle caddy of the present invention when the two are attached for use. By keeping all of the vehicle's wheels on the supporting surface or ground, the center of gravity of the combined unit is lowered thereby stabilizing the motorized wheeled vehicle caddy and the attached wheeled vehicle. Furthermore, without the added weight of the attached vehicle bearing on the motorized wheeled vehicle caddy during use, the motorized wheeled vehicle caddy can be small and lightweight for ease of use and economy of manufacture.

II. SUMMARY

The motorized wheeled vehicle caddy of the present invention is a lightweight device for moving carts and other wheeled vehicles from place to place. The motorized wheeled vehicle caddy comprises a steering mechanism to guide the caddy, a suspension mechanism, and a hitch mechanism to connect the caddy to the wheeled vehicle. In addition, a power drive mechanism can move the motorized wheeled vehicle caddy and any attached vehicle.

It is an object of the present invention to provide a lightweight device for moving wheeled vehicles.

It is a further object of the present invention to provide a motorized wheeled vehicle caddy for maneuvering various carts or other wheeled vehicles that is compact enough to easily fit on an elevator.

It is a further object of the present invention to provide means to reduce injuries for those individuals who are moving carts or other wheeled vehicles.

It is a further object of the present invention to provide a hitching mechanism that can easily connect the motorized wheeled vehicle caddy to a wheeled vehicle.

It is a further object of the present invention to provide a hitching mechanism that can easily be actuated to disconnect an attached wheeled vehicle from the motorized wheeled vehicle caddy.

It is a further object of the present invention to provide means for the operator to connect and disconnect the motorized wheeled vehicle caddy to a wheeled vehicle while remaining in position to control the caddy.

It is a further object of the present invention to provide a motorized wheeled vehicle caddy for maneuvering wheeled vehicles which allows all of the wheels of the vehicles to remain on the floor or supporting surface during use.

It is a further object of the present invention to provide a motorized wheeled vehicle caddy having a leveling system so that it can easily connect to carts on uneven terrain.

It is a further object of the present invention to provide a motorized wheeled vehicle caddy that can push or pull an attached wheeled vehicle.

It is a further object of the present invention to provide a motorized wheeled vehicle caddy that is compact and can fit and maneuver in tight places.

It is a further object of the present invention to provide a motorized wheeled vehicle caddy that is stabilized when attached to a wheeled vehicle.

IV. BRIEF DESCRIPTION OF THE DRAWINGS

Reference is made to the accompanying drawings in which are shown illustrative embodiments of the invention and from which novel features and advantages will be apparent.

V. DETAILED DESCRIPTION

Figure 1:
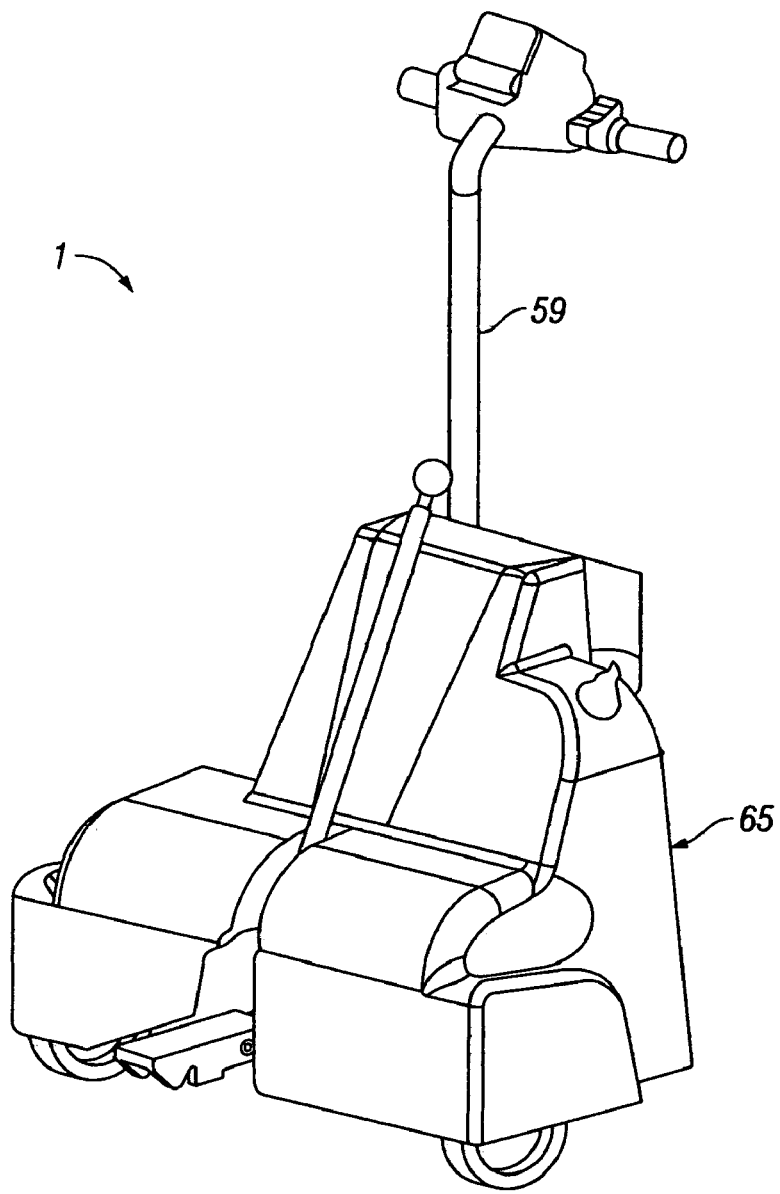
FIG. 1 is a perspective view of the motorized wheeled vehicle caddy of the present invention.

Referring to FIGS. 1-5, the motorized wheeled vehicle caddy 1 of the present invention comprises a steering mechanism 2, a suspension mechanism 3, a power drive mechanism 4, and a hitching assembly 5.

Figure 2:
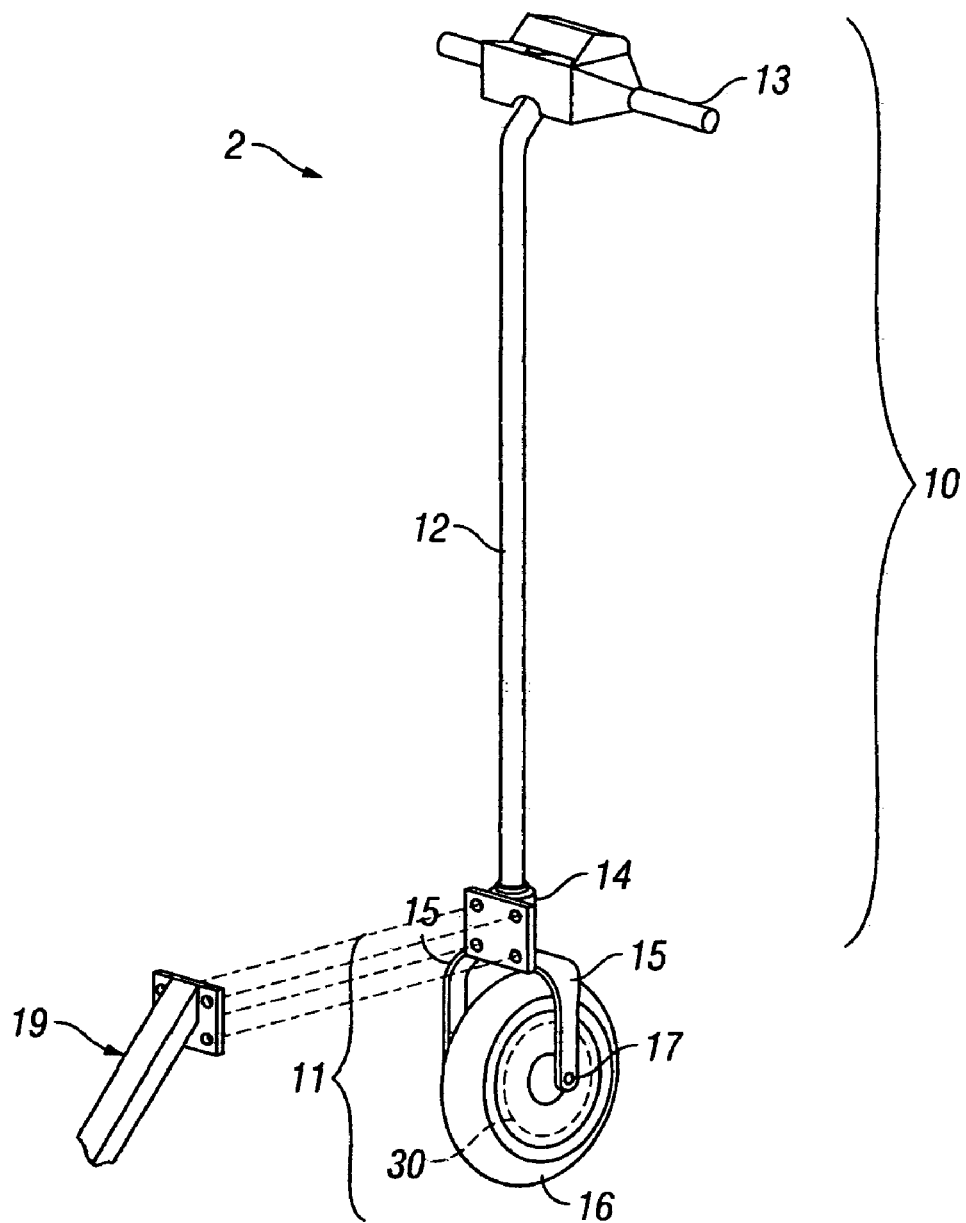
FIG. 2 is a partial view of the steering mechanism of the motorized wheeled vehicle caddy of FIG. 1 with the hub motor of the power drive mechanism indicated by the dotted line.

The steering mechanism 2 in FIG. 2 comprises means for guiding the wheeled vehicle caddy. It includes a steering stanchion 10 and a primary wheel assembly 11. The steering stanchion 10 includes an upright stanchion 12. A handle 13 is disposed on an upper end of the upright stanchion 12 and a pivot bearing 14 is disposed on a lower end of the upright stanchion 12. The steering stanchion 10 further includes a fork 15 which is positioned below the pivot bearing 14 on the upright stanchion 12.

The primary wheel assembly 11 is characterized by a support wheel 16 and an axle 17. The axle 17 rotatably supports the support wheel 16 on the fork 15 of the steering stanchion 10. While the support wheel 16 rotates on the axle 17, the pivot bearing 14 allows the support wheel 16 to pivot about an axis extending along the length of the upright stanchion 12 and to pivot independently of the suspension mechanism 3.

Figure 3:
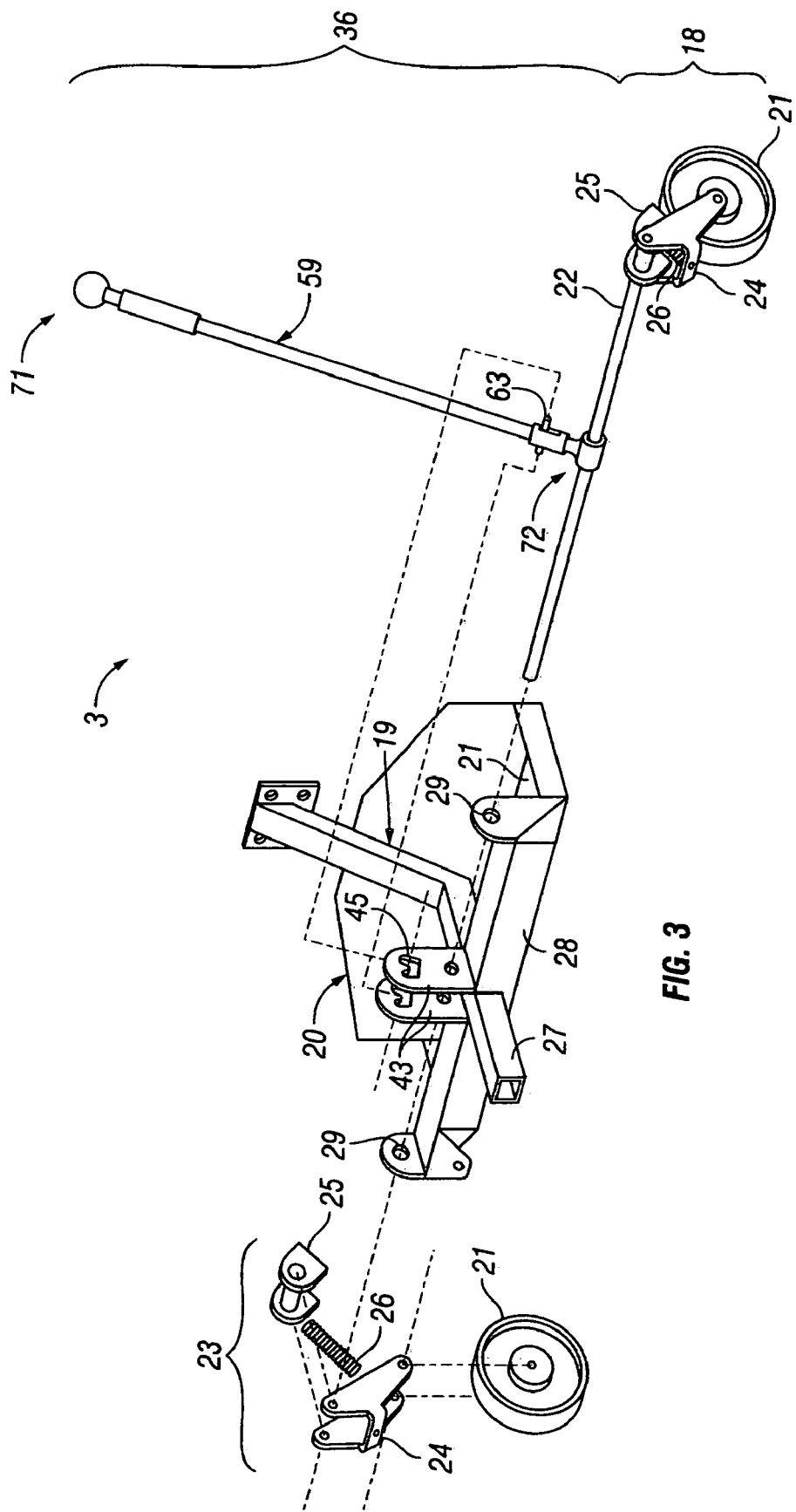
FIG. 3 is an exploded, perspective view of the suspension mechanism of the motorized wheeled vehicle caddy of FIG. 1 shown with the hitch actuator and index plates of the hitching assembly. One of the suspension wheels is assembled and mounted on the wheel axle rod of the suspension mechanism.

The suspension mechanism 3 as shown in FIG. 3 comprises means for stabilizing the steering mechanism. It includes a retractable wheel assembly 18, a suspension bracket 19 and a battery support 20.

The retractable wheel assembly 18 has two suspension wheels 21 supported on a wheel axle rod 22. A pair of wheel hub brackets 23 mount the suspension wheels 21 on the wheel axle rod 22, so that the retractable wheel assembly 18 moves with the wheel axle rod 22 when the axle rod 22 is rotated.

Each of the wheel hub brackets 23 has first 24 and second 25 parts pivotally attached to each other and a suspension spring 26. The suspension spring 26 biases the first 24 and second 25 parts away from each other. The weight of each of the suspension wheels 21 bears on a respective wheel hub bracket 23 and presses the respective first 24 and second 25 parts toward each other against the bias of the suspension spring 26.

The suspension bracket 19 has a central beam 27 and a cross beam 28. The suspension bracket 19 is attached by the central beam 27 to the upright stanchion 12 of the steering mechanism 2. A respective bearing mount 29 is disposed on each end of the cross beam 28.

The battery support 20 comprises a tray 66 which is attached to the cross beam 28 of the suspension bracket 19. In addition, the wheel axle rod 22 is rotatably supported by the bearing mounts 29 on the cross beam 28.

Figure 5:
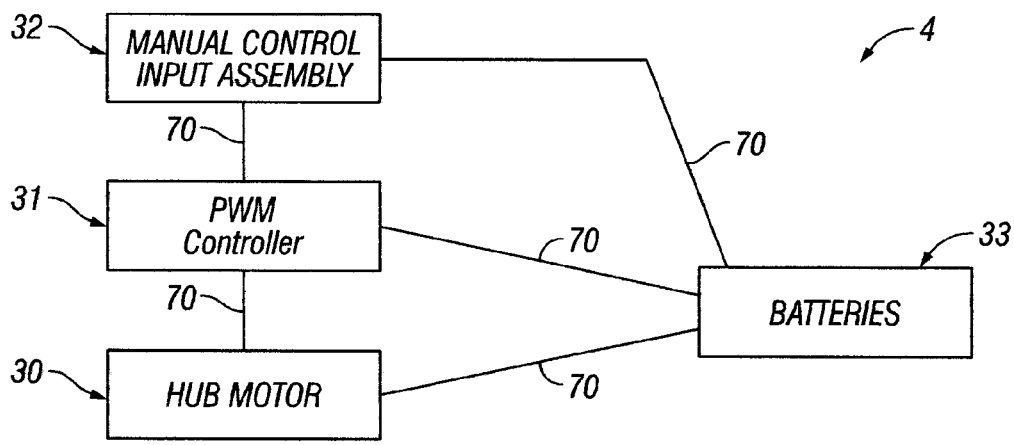
FIG. 5 is a schematic diagram of the power drive mechanism of the motorized wheeled vehicle caddy of FIG. 1.

Referring to FIG. 5, the power drive mechanism 4 comprises a hub motor 30, a power width modulator (PWM) controller 31 and a manual control input assembly 32. Preferably, power is provided to the motorized wheeled vehicle caddy 1 by a 24-volt system comprised of two 12-volt direct current batteries 33. It is noted that the motorized wheeled vehicle caddy 1 can be powered in alternative ways, such as with different battery configurations, or by other suitable means, as desired. The hub motor 30 is mounted in the central hub region of the support wheel 16 of the steering mechanism 2.

Figure 4:
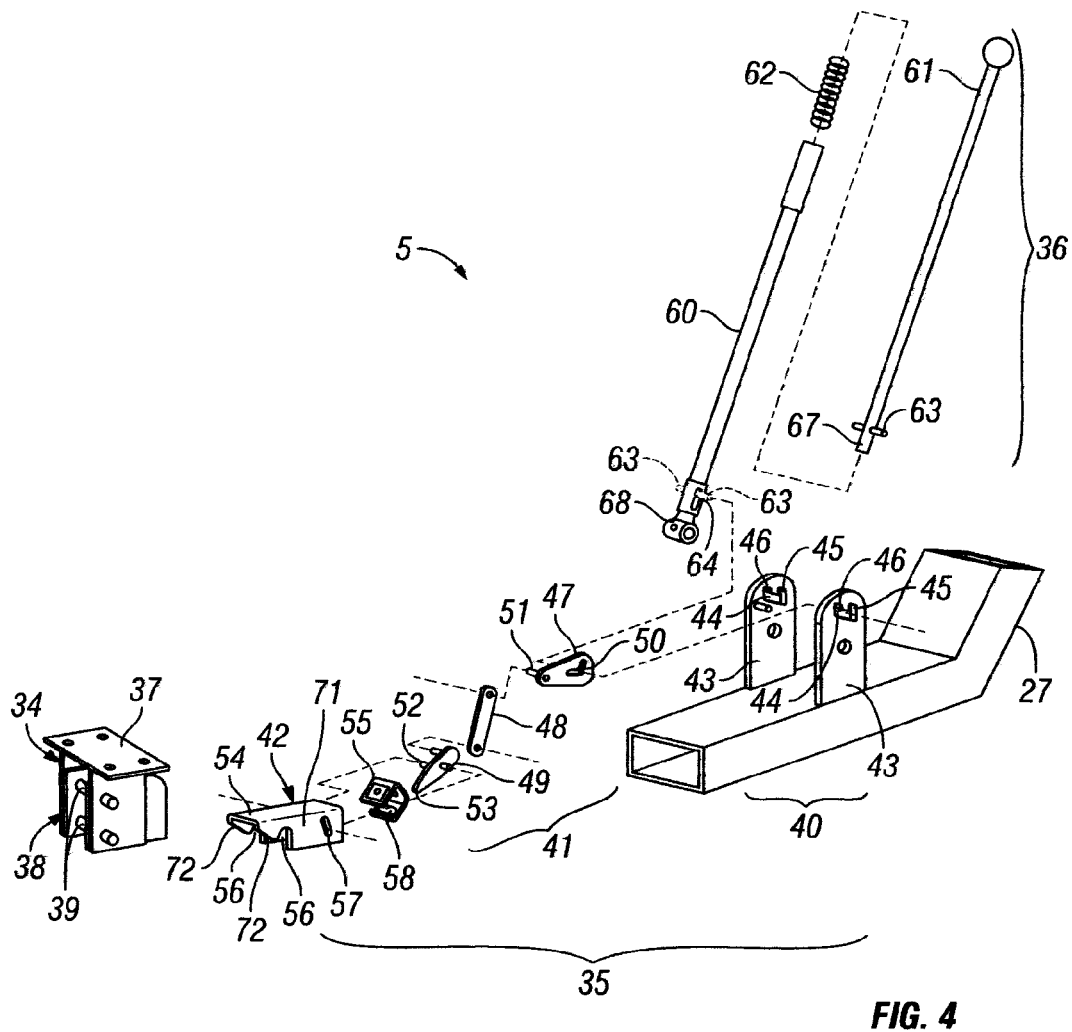
FIG. 4 is an exploded view of the hitching assembly of the motorized wheeled vehicle caddy of FIG. 1.

The hitching assembly 5 shown in FIG. 4 comprises means for releasably attaching a cart or other wheeled vehicle to the motorized wheeled vehicle caddy 1. The primary elements of the hitching assembly 5 include a cart receiver 34, a hitch 35 and a hitch actuator 36.

The cart receiver 34 is adapted to be fixedly installed on a cart or other wheeled vehicle for use. The hitch 35 can be secured to the cart receiver 34 and released therefrom when desired. The cart receiver 34 includes a cart mounting frame 37 and a first coupler 38. In a preferred embodiment, the first coupler 38 includes a plurality of receiving pins 39.

The hitch 35 comprises an index bracket 40, a hitch linkage 41 and a second coupler 42. The index bracket 40 is characterized by a pair of index plates 43 projecting upwardly from the central beam 27 of the suspension bracket 19. Each of the index plates 43 has a U-shaped slot 44. The U-shaped slots 44 on the index plates 43 are aligned across from each other. Each of the U-shaped slots 44 is defined by a rearward slot portion 45 and a forward slot portion 46.

The second coupler 42 of the hitch 35 is comprised of a housing 54 and a latch 55 that is pivotally mounted within the housing 54. The housing 54 has a pair of opposing sidewalls 71. Each sidewall 71 includes a set of grooves 56, a vertical slot 57 and an angled front edge 72. The grooves 56 serve as an initial means for attaching the hitch 35 onto the cart receiver 34.

The hitch linkage 41 comprises a series of linkages extending between the index bracket 40 and the second coupler 42. The linkages include a first linkage 47, a second linkage 48 and a third linkage 49. The first linkage 47 has a first linkage slot 50 and a first pivot pin 51 for engaging the second linkage 48. The third linkage 49 is elongated with one end pivotally engaging the second linkage 48 and the other end having an actuating tip 53. A mid-region of the third linkage 49 includes a third pivot pin 52 that is pivotally and slideably mounted in the vertical slot 57 on the second coupler 42. The second linkage 48 is elongated and is pivotally attached at one end to the first linkage 47 and pivotally attached at the opposite end to the third linkage 49.

The latch 55 comprises secondary means for securing the hitch 35 to the cart receiver 34. A notch 58 in the latch 55 receives one of the receiving pins 39 therein when the hitch 35 is attached to the cart receiver 34.

The hitch actuator 36 is a lever 59 formed by telescoping tubes. The telescoping tubes include an outer tube 60 and an inner tube 61. A lever spring 62 biases the inner tube 61 upwardly from the outer tube 60. The inner tube 61 has an indexing pin 63 disposed on a lower end 67 thereof. The outer tube 60 includes a tube slot 64 on a lower end 68 thereof. The inner tube 61 is slideably disposed in the outer tube 60, with the indexing pin 63 slideably disposed in the tube slot 64. The lower end 68 of the outer tube 60 is fixedly attached to the wheel axle rod 22 of the suspension mechanism 3.

The steering mechanism 2 enables a user to guide the direction of the motorized wheeled vehicle caddy 1 and in so doing, guide any attached cart or other wheeled vehicle. In addition, the steering mechanism 2 at least partially supports other elements of the motorized wheeled vehicle caddy 1 including the suspension mechanism 3, the power drive mechanism 4, and the hitching assembly 5.

On the steering mechanism 2, the support wheel 16 of the primary wheel assembly 11 engages the support surface on which the motorized wheeled vehicle caddy 1 is positioned. The fork 15 is mounted on the axle 17 of the support wheel 16 and supports the upright stanchion 12. The pivot bearing 14 allows the primary wheel assembly 11 to pivot relative to the suspension mechanism 3 in order for an operator to guide the motorized wheeled vehicle caddy 1 as desired. The handle 13 provides means for a user to directly maneuver the support wheel 16 via the steering stanchion 10. The upright stanchion 12 and the support wheel 16 move in response to movement of the handle 13.

The suspension mechanism 3 provides the means for stabilizing the steering mechanism in order to control and move the motorized wheeled vehicle caddy 1. The hub motor 30 directly rotates the support wheel 16 of the primary wheel assembly 11 to move the motorized wheeled vehicle caddy 1 over the support surface. The manual control input assembly 32 receives input from the user as to the selected speed of the motorized wheeled vehicle caddy 1 and transfers the input to the PWM controller 31. The PWM controller 31 receives the selected speed signal from the manual control input assembly 32 and actuates the hub motor 30 in response to the signal, thereby regulating the speed of the motorized wheeled vehicle caddy 1. The batteries 33 provide the requisite power to run the hub motor 30 and thereby move the motorized wheeled vehicle caddy 1.

The suspension mechanism 3 assists in aligning the motorized wheeled vehicle caddy 1 with the cart or other wheeled vehicle to be attached thereto. In so doing, the suspension mechanism 3 provides additional support for the motorized wheeled vehicle caddy 1 when the retractable wheel assembly 18 is lowered to engage the support surface. Each of the wheel hub brackets 23 includes a suspension springs 26 and resiliently mounts a respective suspension wheel 21 on the wheel axle rod 22. The suspension wheels 21 can move independently of each other on the wheel axle rod 22. Furthermore, the wheel axle rod 22 translates the movement of the hitch actuator 36 and rotates in response thereto to raise or lower the suspension wheels 21, depending on the movement and position of the hitch actuator's lever 59.

The suspension bracket 19 supports the tray 66 which holds the batteries 33. The bracket 19 also supports the hitching assembly 5 on the steering mechanism 2.

The hitching assembly 5 releasably attaches the motorized wheeled vehicle caddy 1 to the cart or other wheeled vehicle. The cart receiver 34 is fixedly installed on the cart or other wheeled vehicle and is engaged with the second coupler 42 when the motorized wheeled vehicle caddy 1 is locked to the cart or other wheeled vehicle. In particular, the notch 58 on the latch 55 and the grooves 56 on the housing 54 cooperate to substantially surround the selected receiving pin 39 of the first coupler 38.

The hitch actuator 36 controls the raising and lowering of the suspension wheels 21 while manipulating the movement of the latch 55 and housing 54 of the second coupler 42 into and out of engagement with the first coupler 38. The linkages 47, 48, 49 translate the movement from the hitch actuator 36 to the second coupler 42. The hitch actuator 36 is manipulated directly by a user.

The housing 54 comprises means for aligning the motorized wheeled vehicle caddy 1 and the wheeled vehicle. The angled front edges 72 on the sidewalls 71 of the housing 54 assist in bringing the wheeled vehicle caddy 1 and the wheeled vehicle into alignment during attachment. As the first 38 and second 42 couplers are brought into engagement, the housing 54 slides over the selected receiving pin 39 until the receiving pins 39 finally rest within the housing's grooves 56 and the latch's notch 58.

On even terrain, the angled front edges 72 of both sidewalls 71 will contact the selected receiving pin 39 during engagement. However, if the terrain is uneven so that the wheeled vehicle caddy 1 and the wheeled vehicle are not precisely aligned, only one of the angled front edges 72 of the sidewalls 71 may come into contact with the receiving pin 39 during the initial engagement process. As the second coupler 42 moves into the cart receiver 34 and the receiving pins 39 approach the housing's grooves 56, the housing 57 shifts to thereby align the wheeled vehicle caddy 1 with the first coupler 38 on the wheeled vehicle thereby correcting any significant misalignment between the caddy 1 and the wheeled vehicle.

The index plates 43 guide the movement of the hitch actuator 36 via the indexing pin 63, whereby the U-shaped slots 44 lock the lever 59 in either the selected forward or backward position. The first linkage slot 50 guides the movement of the first linkage 47 as directed by the indexing pin 63. The second linkage 48 is manipulated by the first linkage 47 and translates that movement to the third linkage 49. The vertical slot 57 in the housing 54 of the second coupler 42 guides the movement of the second 48 and third 49 linkages. A free end of the third linkage 49 comprises an actuating tip 53 which secures the latch 55 in the locked position.

Referring to FIGS. 1-5, the steering mechanism 2 is in the rear of the motorized wheeled vehicle caddy 1. It is secured to the suspension mechanism 3 and supports the suspension mechanism 3 in various particular configurations. Attached to the suspension mechanism 3 is the hitching assembly 5 on the front of the motorized wheeled vehicle caddy 1. The power drive mechanism 4 is mounted on both the steering mechanism 2 and the suspension mechanism 3.

On the steering mechanism 2, the handle 13 is disposed on an upper end of the upright stanchion 12. On the lower end of the upright stanchion 12 is the pivot bearing 14 and fork 15. The axle 17 of the primary wheel assembly 11 is mounted on the fork 15 and holds the support wheel 16 thereon.

The hub motor 30 of the power drive mechanism 4 is disposed in a central hub portion of the support wheel 16. The manual control input assembly 32 is mounted on the handle 13 of the steering stanchion 10. Mounted on the upright stanchion 12 is the PWM controller 31. A series of wiring cables 70 interconnects the hub motor 30 and the PWM controller 31 and the manual control input assembly 32.

On the suspension mechanism 3, the suspension bracket 19 is attached to the upright stanchion 12 by the central beam 27. Specifically, the central beam 27 is attached to the pivot bearing 14 of the steering stanchion 10. Extending crossways to the central beam 27 is the cross beam 28 which supports the tray 66 of the battery support 20. The batteries 33 of the power drive mechanism 4 are held within the tray 66 and are further interconnected with the PWM controller 31 and the hub motor 30 and the manual control input assembly 32 by wiring cables 70.

Disposed on opposite ends of the cross beam 28 are the bearing mounts 29 which rotatably support the wheel axle rod 22 thereon. Each of the suspension wheels 21 of the retractable wheel assembly 18 is mounted on the wheel axle rod 22 by a respective wheel hub bracket 23.

The first part 24 of each wheel hub bracket 23 rotatably supports a suspension wheel 21 thereon. The first part 24 is pivotally attached to the second part 25 which is fixedly attached to the wheel axle rod 22. The suspension spring 26 is disposed in compression between the first 24 and second 25 parts so that the parts 24,25 are resiliently biased to pivot away from each other. The resilient biasing of the first 24 and second 25 parts allows each suspension wheel 21 to move toward and away from the wheel axle rod 22 independently of the other wheel 31.

On the hitching assembly 5, the index plates 43 extend parallel and upwardly from the central beam 27. The indexing pin 63 on the lever 59 of the hitch actuator 36 is moveably disposed within the U-shaped slots 44 on the index plates 43 and is selectively moveable between a rearward slot portion 45 and a forward slot portion 46. In addition, the indexing pin 63 is moveably disposed within the L-shaped first linkage slot 50 on the first linkage 47 of the hitch linkage 41. Consequently, the first linkage 47 is moveably secured to the index bracket 40 by the indexing pin 63 of the hitch actuator 36 and can be manipulated by the lever 59.

Furthermore, the first linkage 47 is pivotally attached to one end of the second linkage 48. The other end of the second linkage 48 is pivotally attached to one end of the third linkage 49. The third linkage 49 is slideably mounted at a mid-region thereof to a vertical slot 57 disposed in the housing 54 of the second coupler 42. The latch 55 is pivotally mounted within the second coupler's housing 54. The distal end of the third linkage 49 includes the actuating tip 53. The actuating tip 53 engages a side of the latch 55 to thereby secure the latch 55 in the locked position.

The cart receiver 34 is adapted for attachment to a cart or other wheeled vehicle. The cart mounting frame 37 is preferably installed at a location on the rear of the cart or other wheeled vehicle at a height that is generally commensurate with the height of the second coupler 42 of the hitch 35. In addition, access between the hitch 35 and the first coupler 38 should be unobstructed.

Covering the retractable wheel assembly 18, the batteries 33, portions of the hitching assembly 5 and portions of the steering mechanism 2 is a shroud 65 as shown in FIG. 1. The shroud 65 protects the motorized wheeled vehicle caddy 1 and adds to the overall aesthetic appeal of the caddy.

The latch 55 of the hitch's second coupler 42 comprises a locked position and an unlocked position. In the locked position, the notch 58 on the latch 55 faces in a generally outward direction toward the front of the motorized wheeled vehicle caddy 1, so that when one of the receiving pins 39 is positioned in the grooves 56 of the housing 54, the receiving pin 39 is secured therein. Furthermore, a side of the notch 58 is adjacent to a lower portion of the selected receiving pin 39 and the actuating tip 53 is adjacent to the latch 55 to secure the latch 55 in such a position as to inhibit, removal of the receiving pin 39 from the groove 56 of the second coupler 42 and to lock the first 38 and second 42 couples together.

With the latch 55 in the unlocked position the actuating tip 53 is disengaged from the latch 55 which is free to move. The notch 58 can be rotated away from an outward position to face generally downwardly. The side of the notch 58, which is otherwise adjacent a lower portion of the receiving pin 39 in the locked position, can be moved away from the receiving pin 39 in the unlocked position. The receiving pin 39, disposed in the grooves 56 of the housing 54, is free for removal from the second coupler 42. Conversely, if the grooves 56 do not hold a receiving pin 39 when the latch 55 is in the unlocked position, one can be selectively inserted therein.

The motorized wheeled vehicle caddy 1 includes three configurations. These configurations comprise an unlocked/disengaged configuration, an unlocked/engaged configuration, and a locked/engaged configuration.

Figure 6A:
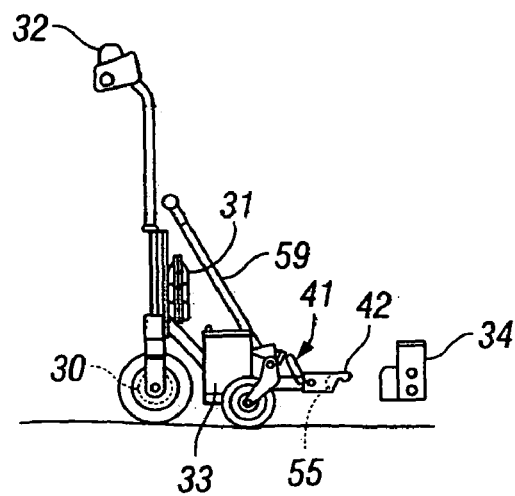
FIG. 6A is an exploded view of the hitching assembly of the motorized wheeled vehicle caddy of FIG. 1 in the unlocked/disengaged configuration.

In the unlocked/disengaged configuration as shown in FIG. 6A, the latch 55 of the second coupler 42 on the hitching assembly 5 is in the unlocked position, and the receiving pin 39 of the first coupler 38 is positioned away from the grooves 56 in the housing 54. In addition, the lever 59 of the hitch actuator 36 is positioned toward the rear of the motorized wheeled vehicle caddy 1, such that the lever 59 extends in a downward direction from the back to the front of the motorized wheeled vehicle caddy 1. Referring also to FIG. 3, the indexing pin 63 on the inner tube 61 of the lever 59 is in the rearward slot portion 45 on the index plates 43. With the indexing pin 63 in the rearward slot portion 45 and the lever 59 extending rearwardly, the suspension wheels 21 are lowered to engage a supporting surface.

Figure 6B:
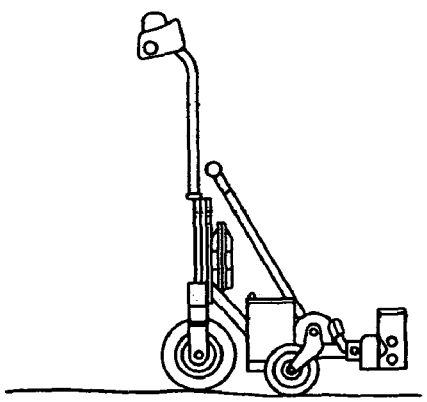
FIG. 6B is an exploded view of the motorized wheeled vehicle caddy of FIG. 1 in the unlocked/engaged configuration.

In the unlocked/engaged configuration shown in FIG. 6B, the latch 55 is in the unlocked position with the notch 58 directed generally downwardly. The housing 54 of the second coupler 42 is disposed adjacent to the cart receiver 34 so that one of the receiving pins 39 is disposed within the grooves 56 of the housing 54. The lever 59 of the hitch actuator 36 is positioned rearwardly toward the back of the motorized wheeled vehicle caddy 1 and the indexing pin 63 is disposed in the rearward slot portion 45 of the index plates 43. The suspension wheels 21 are lowered and engage the support surface.

Figure 6C:
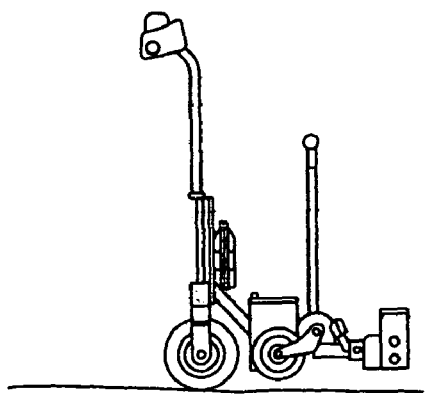
FIG. 6C is an exploded view of the motorized wheeled vehicle caddy of FIG. 1 in the locked/engaged configuration.

In the locked/engaged configuration shown in FIG. 6C, the latch 55 of the second coupler 42 is in the locked position, with one of the receiving pins 39 of the first coupler 38 being disposed and locked within the grooves 56 of the second coupler's housing 54. The lever 59 of the hitch actuator 36 is positioned forwardly such that the lever 59 extends in a generally vertical direction on the motorized wheeled vehicle caddy 1. The indexing pin 63 on the lever's inner tube 61 is positioned in the forward slot portion 46. The suspension wheels 21 are raised and substantially away from the supporting surface. The motorized wheeled vehicle caddy 1 is attached to the wheeled vehicle for use. With the motorized wheeled vehicle caddy 1 in the locked/engaged configuration the attached cart or other wheeled vehicle can then be maneuvered as desired by the user.

When desired, the motorized wheeled vehicle caddy 1 can be attached to a cart or other wheeled vehicle to be moved. With the cart or other wheeled vehicle attached to the motorized wheeled vehicle caddy 1, an operator can control the motorized wheeled vehicle caddy 1 to maneuver the cart or other wheeled vehicle.

To use the motorized wheeled vehicle caddy 1, the cart receiver 34 is first installed on a cart or other wheeled vehicle. The cart mounting frame 37 is secured to the rear of the cart or other wheeled vehicle at a predetermined height. The predetermined height allows the housing 54 of the second coupler 42 to be positioned in proximity to the selected receiving pins 39 of the cart receiver 34.

With the motorized wheeled vehicle caddy 1 in the unlocked/disengaged configuration, the motorized wheeled vehicle caddy 1 is guided to the rear of the cart or other wheeled vehicle by an operator. Movement of the motorized wheeled vehicle caddy 1 is controlled by the operator. The speed of the motorized wheeled vehicle caddy 1 is selected via the manual control input assembly 32 and the direction is determined by the position of the support wheel 16 as guided by the operator via the handle 13 on the upright stanchion 12.

Once the motorized wheeled vehicle caddy 1 is generally aligned with the cart or other wheeled vehicle, the second coupler 42 is more particularly aligned with the first coupler 38, such that the housing 54 is positioned on the first coupler 38 and the selected receiving pin 39 is inserted in the grooves 56 and notch 58. As the receiving pin 39 moves into the grooves 56, the latch 55 pivots into the unlocked/engaged configuration.

The latch 55 is then secured by the actuating tip 53 which is maneuvered by the operator to lock the hitch 35 on to the cart receiver 34. On the hitch actuator 36, the inner tube 61 is depressed within the outer tube 60. The indexing pin 63, which is in the rearward slot portion 45 of the U-shaped slot 44 on the index plates 43, is forced downwardly, thereby releasing the lever 59 to move forwardly. The lever 59 is pushed forwardly, toward the cart or other wheeled vehicle aligned in front of the motorized wheeled vehicle caddy 1. The inner tube 61 is then released and the indexing pin 63 springs upwardly into the forward slot portion 46 of the U-shaped slot 44 on the index plates 43, thereby holding the lever 59 in its forwardly disposed position.

As the lever 59 moves into this forwardly disposed position, the hitch linkage 41 is simultaneously actuated. The first linkage 47 is directly moved by the shifting movement of the indexing pin 63. This movement of the first linkage 47 initiates movement of the second linkage 48, which pivots the third linkage 49. The resultant pivotal movement of the third linkage 49 moves the actuating tip 53 on the distal end of the housing 54. As the actuating tip 53 is moved, it is positioned such that the latch 55 cannot pivot from the locked position, thereby locking the first 38 and second 42 couplers together.

With the movement of the lever 59, the wheel axle rod 22 simultaneously moves. The wheel axle rod 22 is directly rotated by the lever 59 as the lever 59 moves forward. The rotation of the wheel axle rod 22 raises the suspension wheels 21 up and off the supporting surface. With the first 38 and second 42 couplers locked together, the cart or other wheeled vehicle is secured to the motorized wheeled vehicle caddy 1 and the suspension wheels 21 are off the ground.

To detach the cart or other wheeled vehicle from the motorized wheeled vehicle caddy 1, the aforementioned steps are reversed. The inner tube 61 is depressed and the lever 59 is moved rearwardly, thereby releasing the latch 55 to the unlocked position and lowering the suspension wheels 21. With the latch 55 unlocked and the suspension wheels 21 lowered, the caddy 1 can be drawn away from the cart or other wheeled vehicle.

The motorized wheeled vehicle caddy 1 of the present invention with an attached cart or other wheeled vehicle can be easily moved by a single operator. In addition, the cart or other wheeled vehicle can be attached to and detached from the motorized wheeled vehicle caddy 1 with the operator remaining in an operating position behind the motorized wheeled vehicle caddy 1. This makes gathering, moving and releasing carts or other wheeled vehicles a quick and easy task.

The hitching assembly 5 of the present invention enables the attached cart or other wheeled vehicle to be either pushed or pulled, thereby increasing the versatility of the motorized wheeled vehicle caddy 1. The suspension wheels 21 provide stability for the motorized wheeled vehicle caddy 1 when no cart or other wheeled vehicle is attached. However, when a cart or other wheeled vehicle is attached, the suspension wheels can be raised to facilitate maneuvering the motorized wheeled vehicle caddy 1 and attached cart or other wheeled vehicle.

Although the present invention has been described in considerable detail with reference to certain preferred versions thereof, other versions are possible. Therefore, the spirit and scope of the appended claims should not be limited to the description of the preferred versions contained herein.

The invention claimed is:

1. A motorized wheeled vehicle caddy for maneuvering a wheeled vehicle on a supporting surface, said motorized wheeled vehicle caddy comprises:
   a steering mechanism;
   a power drive mechanism;
   a suspension mechanism for stabilizing the steering mechanism; and
   a hitching assembly for releasably attaching the vehicle caddy to the wheeled vehicle;
   wherein said suspension mechanism is attached to the steering mechanism, the hitching assembly is attached to the suspension mechanism; and said power drive mechanism is attached to said steering mechanism and said suspension mechanism;
   said suspension mechanism comprises a retractable wheel assembly having at least one suspension wheel that can be raised and lowered;
   said hitching assembly comprises a hitch actuator for raising and lowering said at least on suspension wheel; and
   said hitch actuator comprises a lever having an inner tube, an outer tube and a lever spring, wherein said inner and outer tubes are telescopically disposed and said lever spring biases the inner tube outwardly from the outer tube.

2. The motorized wheeled vehicle caddy of claim 1, wherein said retractable wheel assembly further includes a wheel axle rod and at least one wheel hub bracket attaching the at least one suspension wheel to the wheel axle rod; and
   wherein said hitch actuator is attached to said wheel axle rod.

3. The motorized wheeled vehicle caddy of claim 1, wherein said hitch further comprises an index plate that guides the movement of the hitch actuator to forward and rearward positions, whereby said at least one suspension wheel is alternately raised and lowered, respectively.

4. A motorized wheeled vehicle caddy for maneuvering a wheeled vehicle on a supporting surface, said motorized wheeled vehicle caddy comprises:
   a steering mechanism;
   a power drive mechanism;
   a suspension mechanism for stabilizing the steering mechanism and a hitching assembly for releasably attaching the vehicle caddy to the wheeled vehicle;
   said hitching assembly comprises a cart receiver adapted for fixed attachment to the wheeled vehicle and a hitch for selectively and releasably engaging the cart receiver;
   wherein said suspension mechanism is attached to the steering mechanism, said hitching assembly is attached to said suspension mechanism, and said power drive mechanism is attached to said steering mechanism and to said suspension mechanism.

5. The motorized wheeled vehicle caddy of claim 4, wherein said cart receiver comprises a mounting frame and a first coupler, wherein said hitch engages the first coupler when the wheeled vehicle is attached to the cart caddy.

6. The motorized wheeled vehicle caddy of claim 5, wherein said first coupler comprises a plurality of receiving pins disposed on the mounting frame for selective engagement by the hitch.

7. The motorized wheeled vehicle caddy of claim 5, wherein said hitching assembly further comprises a hitch actuator for engaging and disengaging the hitch from the first coupler on the cart receiver.

8. The motorized wheeled vehicle caddy of claim 7, wherein said hitch actuator comprises a lever; and said hitch comprises a hitch linkage and a second coupler for engaging said first coupler;

wherein said lever actuates the hitch linkage and the second coupler in order to connect the first and second couplers when attaching the cart caddy to the wheeled vehicle and to disconnect the first and second couplers when detaching the cart caddy from the wheeled vehicle.

9. The motorized wheeled vehicle caddy of claim 8, wherein said second coupler comprises a housing and a latch pivotally mounted on the housing; said latch having a locked position and an unlocked position; and said first coupler comprising at least one receiving pin;

wherein in said locked position, said latch is closed to secure said at least one receiving pin therein and in said unlocked position, said latch is opened to allow the insertion or removal of said at least one receiving pin therefrom.

10. The motorized wheeled vehicle caddy of claim 9, wherein said hitch linkage comprises first, second and third linkages;

wherein the first linkage is engaged with the lever of the hitch actuator, the second linkage is attached to the first and third linkages, and the third linkage includes an actuating tip that engages the latch to secure the latch in said locked position.

11. The motorized wheeled vehicle caddy of claim 10, wherein said hitch further comprises an index bracket having at least one U-shaped slot with forward and rearward slot portions; the first linkage includes a first linkage slot having a generally L-shape; the third linkage includes a third pivot pin; the housing includes at least one groove and a vertical slot; and said lever includes an indexing pin disposed on a lower end thereof; and wherein said index bracket is mounted on the suspension bracket; said indexing pin is moveably positioned in the at least one generally U-shaped slot of the index bracket and the first linkage slot on the first linkage; said third pivot pin is moveably mounted in the vertical slot of the housing; and said indexing pin is movable between the forward and rearward slot portions of the index bracket.

12. The motorized wheeled vehicle caddy of claim 11, wherein said suspension mechanism comprises a plurality of retractable suspension wheels.

13. The motorized wheeled vehicle caddy of claim 12, further comprising (1) a locked/engaged configuration, (2) an unlocked/engaged configuration and (3) an unlocked/disengaged configuration;

wherein in said engaged/locked configuration said cart caddy is attached to the wheeled vehicle for use, said hitch is attached to said cart receiver, one of the receiving pins is disposed in said at least one groove of the housing, the lever is positioned forwardly with the indexing pin disposed in the forward slots of the index plate, the suspension wheels are raised up and away from a supporting surface, said actuating tip secures said latch in the locked position, and a side of the notch engages a lower side of the receiving pin disposed in the groove to deter removal of the receiving pin from the groove;

wherein in said unlocked/engaged configuration one of the receiving pins is disposed in the at least one groove of the second coupler, the lever is positioned rearwardly with the indexing pin disposed in the rearward slot of the index plates, the suspension wheels are lowered to engage the supporting surface, the actuating tip is disengaged from the latch, and the latch is in the unlocked position whereby a side of the notch can be disengaged from a lower side of the one receiving pin to allow removal of the receiving pin from the latch and housing of the second coupler;

wherein in said unlocked/disengaged configuration the cart caddy is unattached from the wheeled vehicle, whereby the first and second coupler are apart from each other, the lever is positioned rearwardly with the indexing pin disposed in the rearward slots of the index plates, and the receiving pins are disengaged from the at least one groove of the second coupler.

14. The motorized wheeled vehicle caddy of claim 9, wherein said at least one receiving pin comprises a plurality of receiving pins.

15. A motorized wheeled vehicle caddy for maneuvering a wheeled vehicle on a supporting surface, said motorized wheeled vehicle caddy comprises:

a steering mechanism;

a power drive mechanism;

a suspension mechanism for stabilizing the steering mechanism; and a hitching assembly for releasably attaching the vehicle caddy to the wheeled vehicle;

wherein said suspension mechanism is attached to the steering mechanism; said hitching assembly is attached to said suspension mechanism; and said power drive mechanism is attached to both said steering mechanism and said suspension mechanism;

said suspension mechanism comprises a retractable wheel assembly having at least one suspension wheel that can be raised and lowered;

said hitching assembly comprises a hitch actuator for raising and lowering said at least one suspension wheel;

said retractable wheel assembly comprises a wheel axle rod and at least one wheel hub bracket attaching the at least one suspension wheel to the wheel axle rod;

wherein said hitch actuator is attached to said wheel axle rod;

said at least one wheel hub bracket comprises first and second parts and a suspension spring;

wherein said first and second parts are pivotally adjoined; said at least one suspension wheel is pivotally attached to said first part; said second part is fixedly attached to said wheel axle rod; and said suspension spring biases the first part away from the second part.

16. A motorized wheeled vehicle caddy for maneuvering a wheeled vehicle on a supporting surface, said motorized wheeled vehicle caddy comprises:

a steering mechanism including a steering stanchion and a primary wheel assembly;

a power drive mechanism;

a suspension mechanism for stabilizing the steering mechanism; and a hitching assembly for releasably attaching the vehicle caddy to the wheeled vehicle;

wherein the hitching assembly is attached to the suspension mechanism, and the power drive mechanism is attached to said steering mechanism and to said suspension mechanism;

said primary wheel assembly includes a support wheel;

said steering stanchion includes an upright standard and a handle, wherein said handle is disposed on one end of said upright standard and said support wheel is disposed on an end of the upright standard opposite said handle;

said steering stanchion comprises a pivot bearing;

wherein said suspension mechanism is mounted on said pivot bearing such that said upright standard and said support wheel pivot relative to said suspension mechanism.

17. The motorized wheeled vehicle caddy of claim 16, wherein said power drive mechanism includes a hub motor; and said hub motor is disposed in said support wheel.

18. The motorized wheeled vehicle caddy of claim 16, wherein said hitching assembly includes means for aligning said wheeled vehicle cart caddy and the wheeled vehicle.

19. A motorized wheeled vehicle caddy for maneuvering a wheeled vehicle on a supporting surface, said motorized wheeled vehicle caddy comprises:
   means for guiding the cart caddy;
   means for moving the cart caddy;
   means for stabilizing the cart caddy; and
   means for releasably attaching the wheeled vehicle to the cart caddy.

20. A motorized wheeled vehicle caddy for maneuvering a wheeled vehicle on a supporting surface, said motorized wheeled vehicle caddy comprises:
   a steering mechanism;
   a power drive mechanism;
   a suspension mechanism; and
   a hitching assembly;
   said steering mechanism comprises (a) a steering stanchion and (b) a primary wheel assembly;
      (a) said steering stanchion includes a handle, an upright standard and a pivot bearing; and
      (b) said primary wheel assembly includes a support wheel;
   wherein said handle is mounted on one end of said upright standard and said support wheel is mounted on an opposite end of said upright standard, said pivot bearing is mounted on said upright standard between said handle and said support wheel;
   said suspension mechanism comprises a retractable wheel assembly, a suspension bracket, and a battery support;
      said retractable wheel assembly includes two suspension wheels, a wheel axle rod and two wheel hub bracket;
      each of said wheel hub brackets comprises first and second parts and a suspension spring;
      said suspension bracket includes a central beam and a cross beam;
      said cross beam has a plurality of bearing mounts for rotatably supporting the wheel axle rod;
   wherein said central beam is attached to the pivot bearing of the steering stanchion; each of said suspension wheels is mounted on said wheel axle rod by a respective one of said wheel hub brackets; on each of said wheel hub brackets said first part is pivotally attached to a respective second part and said second part is fixedly attached to a respective end of said wheel axle rod; each of said suspension wheels is rotatably mounted on a respective one of said first parts of the wheel hub bracket; and one of said suspension springs is mounted in compression between each respective one of said first and second parts, and each of said suspension springs biases a respective pair of the attached first and second parts apart;

said power drive mechanism comprises a hub motor, a power width modulator controller, at least one battery, a manual control input assembly, and a plurality of wiring cables;
   said wiring cables interconnect the at least one battery, the hub motor, the power width modulator controller and the manual control input assembly;
   wherein said hub motor is disposed within the support wheel;
   said hitching assembly comprises a hitch actuator, a cart receiver, and a hitch;
      said hitch actuator includes a lever having an outer tube, an inner tube and a lever spring;
      said inner tube includes at least one indexing pin on a lower end thereof;
      said outer tube includes at least one tube slot on a lower end thereof;
      said cart receiver has a mounting frame and a first coupler;
      said first coupler comprises a plurality of receiving pins positioned on the mounting frame;
      wherein said mounting frame rigidly attaches said cart receiver to the wheeled vehicle; and said receiving pins are releasably engaged with the hitch;
      said hitch comprises an index bracket, a hitch linkage, and a second coupler;
         said index bracket includes a pair of index plates;
         each of said index plates has a U-shaped slot;
         each of said U-shaped slots has forward and rearward slot portions;
      said second coupler includes a housing and a latch pivotally disposed within said housing;
      said housing has a pair of sidewalls, each sidewall includes at least one groove, a vertical slot and an angled front edge;
      said latch includes a notch for releasably engaging one of said receiving pins therein;
      said latch further comprises locked and unlocked positions;
      wherein said second coupler is adapted to engage said first coupler when the cart caddy is attached to the wheeled vehicle, whereby one of said receiving pins of the first coupler on the cart receiver is disposed in the at least one groove of the housing;
      said hitch linkage includes first, second and third linkages;
      said first linkage is generally triangular-shaped and has a first, L-shaped linkage slot and a first pivot pin;
      said second linkage is elongated and is attached at one end to the first linkage and attached at an opposite end to the third linkage;
      said third linkage includes a third pivot pin and an actuating tip;
      wherein said third pivot pin is disposed on a mid-region of the third linkage and is moveably mounted in the vertical slot of the housing of the second coupler; said actuating tip selectively engages the latch to secure the latch in the locked position;
   wherein said lever of the hitch actuator has one free upper end and an opposite lower end, said lower end is attached to the wheel axle rod; the inner tube of the lever is telescopically received within said outer tube; said lever spring biases said inner and outer tubes in opposite directions, and said indexing pin is disposed in the tube slot of the outer tube;

wherein said mounting frame of the cart receiver is adapted to be attached to the wheeled vehicle;

wherein said index bracket is mounted on the central beam of the suspension bracket with said index plates spaced apart and said U-shaped slots generally aligned horizontally; the lower end of the lever is disposed between the index plates; the indexing pin on the inner tube of the hitch actuator is moveably positioned in each of the U-shaped slots and in the first linkage slot of the first linkage;

wherein said latch is pivotally mounted in the housing with the notches on the latch being at least partially aligned with the grooves of the housing;

said cart caddy further comprises (1) a locked/engaged configuration, (2) an unlocked/engaged configuration and (3) an unlocked/disengaged configuration;

wherein in said engaged/locked configuration said cart caddy is attached to the wheeled vehicle for use, said hitch is attached to said cart receiver, one of the receiving pins is disposed in said at least one groove of the housing, the lever is positioned forwardly in a generally vertical disposition with the indexing pin disposed in the forward slots of the index plate, the suspension wheels are raised up and away from a supporting surface, said actuating tip secures said latch in the locked position, and the latch deters removal of the receiving pin from the groove;

wherein in said unlocked/engaged configuration one of the receiving pins is disposed in the at least one groove of the second coupler, the lever is positioned rearwardly with the indexing pin disposed in the rearward slot of the index plates, the suspension wheels are lowered to engage the supporting surface the actuating tip is disengaged from the latch, the latch is in the unlocked position to allow removal of the receiving pin from the latch and housing of the second coupler;

wherein in said unlocked/disengaged configuration the cart caddy is unattached from the wheeled vehicle, whereby the first and second coupler are apart from each other, the lever is positioned rearwardly with the indexing pin disposed in the rearward slots of the index plates, and the receiving pins are disengaged from the at least one groove of the second coupler.

\* \* \* \* \*